US012793108B1

(12) United States Patent
Sterlicht et al.

(10) Patent No.: US 12,793,108 B1
(45) Date of Patent: Nov. 10, 2026

(54) SYSTEM, METHOD, AND COMPUTER PROGRAM PROVIDING AN ARTIFICIAL INTELLIGENCE-BASED CATALOG IMPLEMENTATION

(71) Applicant: Amdocs Development Limited, Limassol (CY)

(72) Inventors: Doron Sterlicht, Tel Aviv (IL); Noam Rekem, Kfar Saba (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 311 days.

(21) Appl. No.: 18/130,295

(22) Filed: Apr. 3, 2023

(51) Int. Cl.
*G06Q 30/0601* (2023.01)
*G06F 16/23* (2019.01)
*G06F 16/242* (2019.01)

(52) U.S. Cl.
CPC ..... *G06Q 30/0603* (2013.01); *G06F 16/2379* (2019.01); *G06F 16/243* (2019.01)

(58) Field of Classification Search
CPC ............ G06Q 30/0603; G06F 16/2379; G06F 16/243
See application file for complete search history.

(56) References Cited

U.S. PATENT DOCUMENTS 8,069,096 B1 * 11/2011 Ballaro .............. G06Q 30/0603 705/27.2
10,235,449 B1 * 3/2019 Viswanathan ........ G06F 40/117
10,354,275 B1 * 7/2019 Ben-Shahar ......... G06Q 30/016
11,392,578 B1 * 7/2022 James ............... G06F 16/24573
12,197,503 B1 * 1/2025 Gangadharaiah ............................ G06F 16/90332
2006/0026011 A1 * 2/2006 Verego ................. G06Q 10/063 705/7.11
2012/0254000 A1 * 10/2012 Ryzhikov ............... G06Q 10/00 705/30
2015/0205674 A1 * 7/2015 Schroth ............... G06F 11/1458 707/649
2016/0335685 A1 * 11/2016 Rehman ................ G06F 16/285
2018/0218042 A1 * 8/2018 Krishnan ............ G06F 16/2455
2022/0207507 A1 * 6/2022 Berg ...................... G06N 20/00
2022/0327119 A1 * 10/2022 Gasper ................ G06F 16/9024
2022/0414136 A1 * 12/2022 Jones ..................... G06N 20/00
2023/0013479 A1 * 1/2023 Sankaranarayanan ....................... G06N 20/00
2023/0139397 A1 * 5/2023 Zhong ..................... G06F 40/30 704/9

* cited by examiner

*Primary Examiner* — Charles Rones
*Assistant Examiner* — Mohammad S Bhuyan
(74) *Attorney, Agent, or Firm* — Zilka-Kotab, P.C.

(57) ABSTRACT

As described herein, a system, method, and computer program provide an artificial intelligence-based catalog implementation. An unstructured natural language input indicating a request for a data implementation in a catalog is received. The natural language input is processed, using a machine learning model, to generate a structured catalog implementation request. Catalog-specific meta-data is generated for the structured catalog implementation request. The data implementation is provided in the catalog by storing the catalog-specific meta-data in the catalog.

6 Claims, 4 Drawing Sheets

SYSTEM, METHOD, AND COMPUTER PROGRAM PROVIDING AN ARTIFICIAL INTELLIGENCE-BASED CATALOG IMPLEMENTATION

FIELD OF THE INVENTION

The present invention relates to data implementation in a catalog.

BACKGROUND

A catalog is generally a data structure that is configured to store information defining various offerings of a business. The offerings defined in the catalog are the basis for the commerce and the billing of the business. However, implementation of data in a catalog has typically required significant manual work. This is because the offerings of a business are usually complex, including products, offers based on the products, pricing, definitions, eligibility rules, and promotions, all of which must be manually configured in the catalog by a user.

There is thus a need for addressing these and/or other issues associated with the prior art. For example, there is a need to provide an artificial intelligence-based catalog implementation.

SUMMARY

As described herein, a system, method, and computer program provide an artificial intelligence-based catalog implementation. An unstructured natural language input indicating a request for a data implementation in a catalog is received. The natural language input is processed, using a machine learning model, to generate a structured catalog implementation request. Catalog-specific meta-data is generated for the structured catalog implementation request. The data implementation is provided in the catalog by storing the catalog-specific meta-data in the catalog.

DETAILED DESCRIPTION

Figure 1:
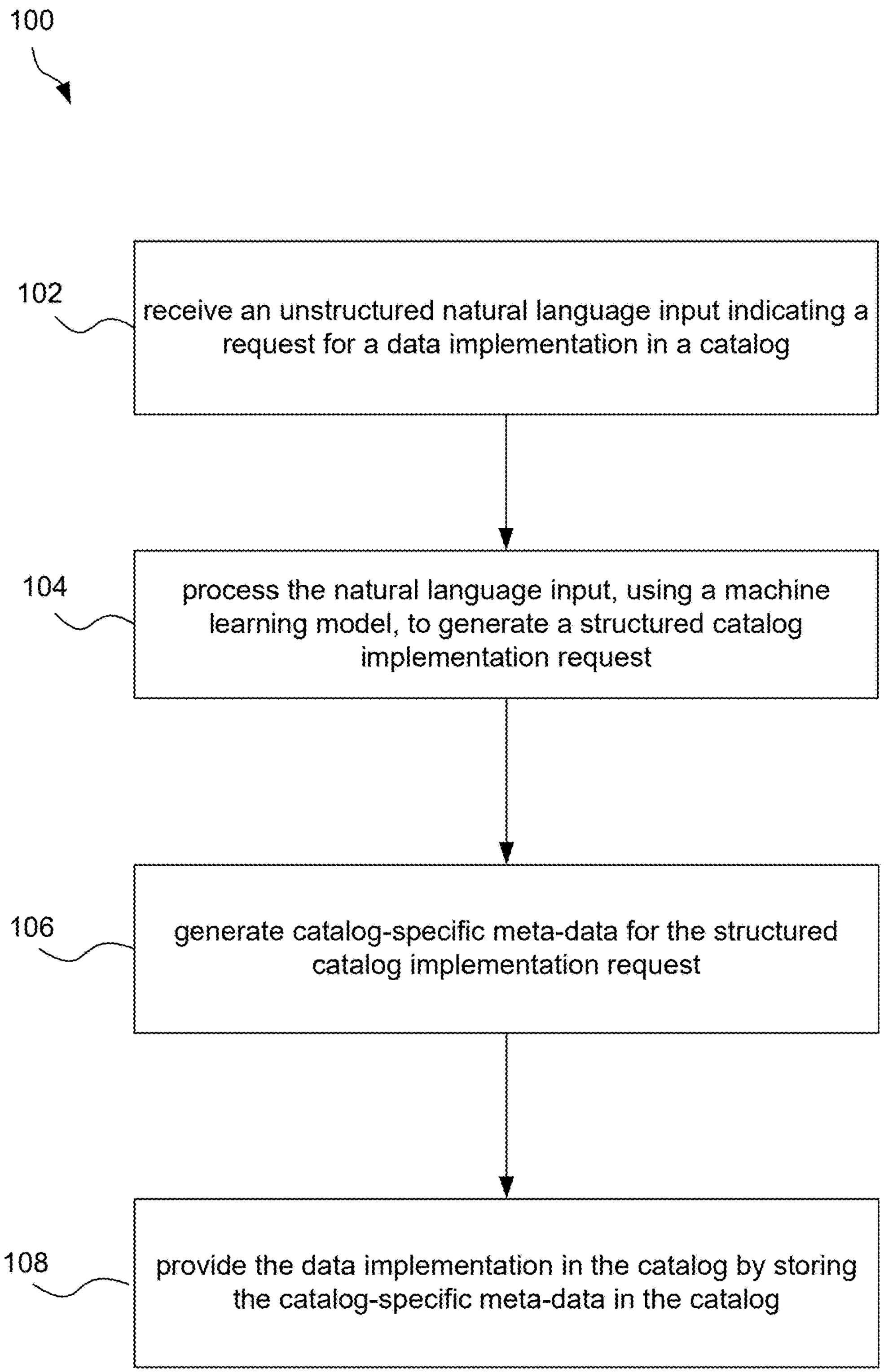
FIG. 1 illustrates a method for providing an artificial intelligence-based catalog implementation, in accordance with one embodiment.

FIG. 1 illustrates a method for providing an artificial intelligence-based catalog implementation, in accordance with one embodiment. The method 100 may be carried out by a computer system, such as that described below with respect to FIGS. 3 and/or 4. In an embodiment, the computer system may implement a product catalog. In another embodiment, the computer system may interface (e.g. via a network) another system having the product catalog.

In operation 102, an unstructured natural language input indicating a request for a data implementation in a catalog is received. The catalog refers to any data structure configured to store catalog data for one or more businesses, such as products, offers, prices, promotions, etc. In an embodiment, a business may use the catalog as the basis for commerce and billing processes.

The unstructured natural language input refers to any input provided in a natural (e.g. spoken) language that is unstructured (e.g. not formatted in accordance with a defined structure). In an embodiment, the unstructured natural language input may be a text-based input. The text-based input may be entered by a user (e.g. in a input field of a user interface). In another embodiment, the text-based input may be converted from a voice-based input provided by a user (e.g. via a microphone feature of a user interface).

As mentioned above, the unstructured natural language input indicates a request for a data implementation in the catalog. The data implementation refers to the implementation of data in the catalog. In an embodiment, the data implementation in the catalog corresponds to a catalog entity, such as a product, an offer, a price, or a promotion. To this end, the request for the data implementation may include a request for a new entry in the catalog for the catalog entity, a request for a modified entry in the catalog for the catalog entity, or a request to remove an existing entry in the catalog for the catalog entity.

In an embodiment, the unstructured natural language input may be received via a natural language processing catalog tool. The natural language processing catalog tool may include the user interface(s) mentioned above, and may be a component of an interface to the catalog. In an embodiment, the natural language processing catalog tool may be provided in combination with an existing catalog user interface via which users can manually enter data into the catalog.

In operation 104, the natural language input is processed, using a machine learning model, to generate a structured catalog implementation request. With the respect to the present description, the structured catalog implementation request refers to a request for the data implementation in the catalog that is formatted in accordance with a defined structure. In an embodiment, the structured catalog implementation request may be declarative and may include parameters, actions, and references for the data implementation. In an embodiment, the structured catalog implementation request may conform to a predefined schema designed for holding catalog implementation requests.

As indicated, a machine learning model is used to process the natural language input in order to generate the structured catalog implementation request. Accordingly, the machine learning model is a model trained using machine learning to infer structured catalog implementation requests from given natural language input that indicates a request for a data implementation in a catalog. In an embodiment, the machine learning model may be trained for a domain of the catalog. For example, the machine learning model is trained on the catalog (i.e. on existing data in the catalog). In another embodiment, the machine learning model may be further trained on at least one additional operational database, such as a customer database.

In an embodiment where the machine learning model is unable to initially generate the structured catalog implementation request from the given natural language input, the machine learning model may indicate such a result. In an embodiment, processing the natural language input to generate the structured catalog implementation request may further include determining that additional information is required to generate the structured catalog implementation request (e.g. based on the aforementioned result), requesting the additional information from a user, and finally processing the natural language input with the additional information, using the machine learning model, to generate the structured catalog implementation request.

In operation 106, catalog-specific meta-data is generated for the structured catalog implementation request. The catalog-specific meta-data refers to meta-data that the catalog is configured to be able to store. In an embodiment, the catalog-specific meta-data may be meta-data in a format used by the catalog.

As indicated, the catalog-specific meta-data is generated specifically for the structured catalog implementation request. In an embodiment, the catalog-specific meta-data may include any of the information included in the structured catalog implementation request. In an embodiment, the catalog-specific meta-data may be generated by parsing the structured catalog implementation request, and for example reformatting the parsed data into the catalog-specific meta-data.

In operation 108, the data implementation is provided in the catalog by storing the catalog-specific meta-data in the catalog. In an embodiment, the catalog-specific meta-data may be stored in a new entry in the catalog (e.g. where the data implementation is for a new catalog entity). In another embodiment, the catalog-specific meta-data may be stored in an existing entry in the catalog (e.g. where the data implementation is to modify an existing catalog entity or is being stored to indicate a removal of an existing catalog entity).

To this end, the method 100 may be performed to provide an artificial intelligence-based catalog implementation, namely by using the machine learning model and other processing operations to provide the data implementation in the catalog from the given unstructured natural language input. With this method 100, the implementation time will be significantly decreased with regard to the user otherwise having to manually configure catalog entities, in particular by allowing the user to specify the business need in a natural language (either as text or speech converted to text) which is then processed using a machine learning model to generate the requested catalog entities with their configuration. Furthermore, this method 100 will leave little if any fine tuning to be done using the catalog user interface itself and/or additional prompts. It should be noted also that the existing catalog user interface and the natural language processing catalog tool described herein may work in tandem, such that a user can choose to use the natural language processing catalog tool for only a subset of work needed to define a new data implementation while using the existing catalog user interface to further define (e.g. refine) the new data implementation.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
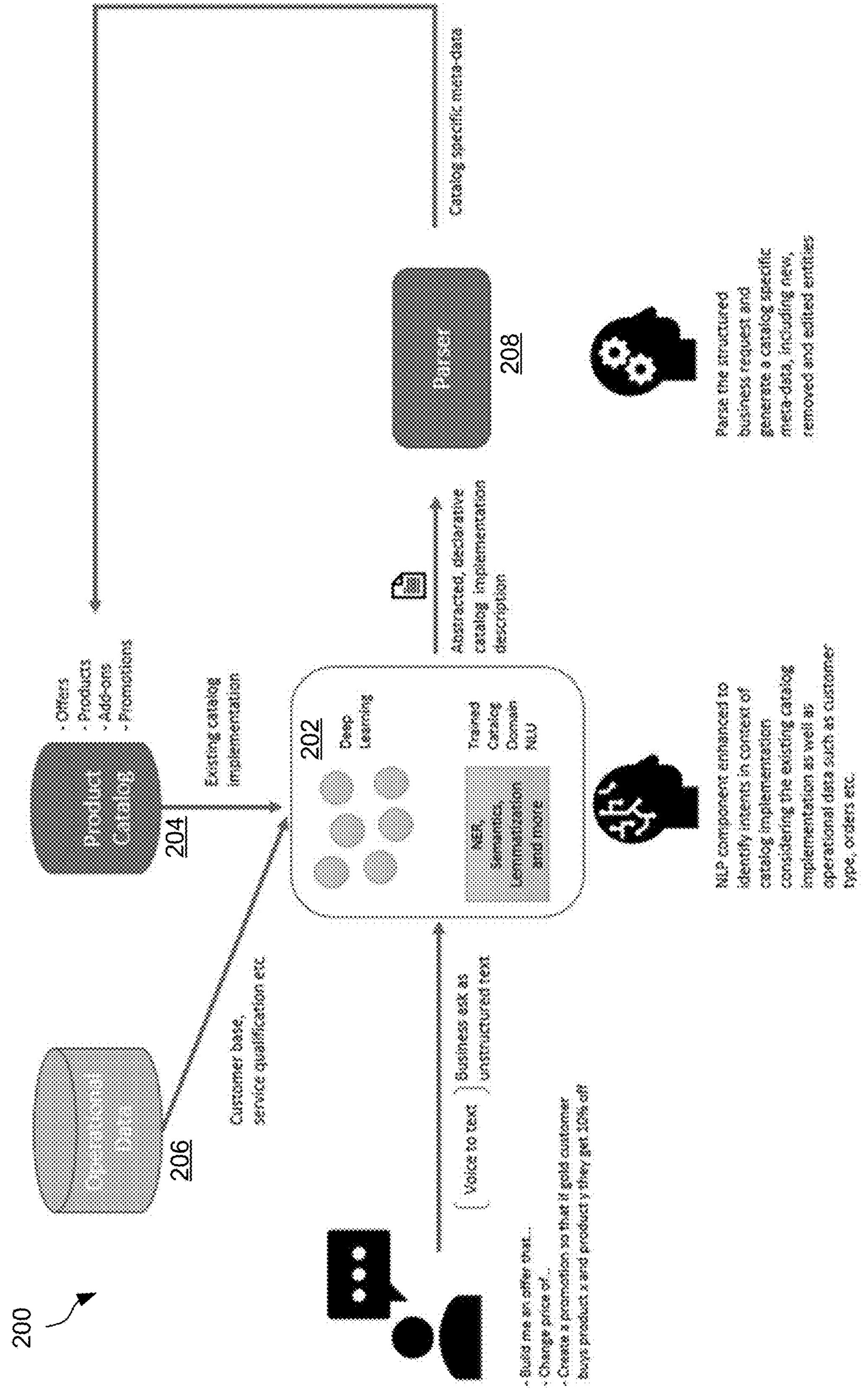
FIG. 2 illustrates a flow diagram of a system providing an artificial intelligence-based catalog implementation, in accordance with one embodiment.

FIG. 2 illustrates a flow diagram of a system 200 providing an artificial intelligence-based catalog implementation, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

Terms

- Catalog—Provides the management of product and offer lifecycle for entire portfolio of companies in different verticals.
- Product—A service or good sold by the company which provides value to its customers.
- Offer—A business/commercial offering encapsulating one or more products, to be sold. The definition covers all aspects required to ensure the offer is available to the right target population, priced correctly, and other drive different systems to fulfill the product.
- Catalog/Data Implementation—The activity of defining different entities in the catalog to serve a business purpose such as Sale, Billing, Charging, etc.
- Promotion—The ability to define a benefit on one or more offers, and the conditions to be eligible to the benefit.

As a whole, the system 200 operates to translate an unstructured natural language text describing a business need for a data implementation in a catalog into a set of catalog implementation actions. Initially, the system 200 receives an unstructured natural language input from a user which indicates a request for a data implementation in a catalog. The unstructured natural language input is received as text from the user or as speech that is converted to text.

A natural language processing component 202 is specifically designed to use artificial intelligence to comprehend the unstructured natural language input and to convert it to a structured, generic, and abstracted catalog business request (i.e. a structed catalog implementation request). The natural language processing component 202 generates a declarative, structured text describing the business request, including all the parameters, actions, and references. The text conforms to a predefined schema, especially designed for holding catalog implementation requests.

The natural language processing component 202 implements several natural language processing techniques, including a trained machine learning model that can process the unstructured natural language input to generate a structured catalog implementation request. In particular, the machine learning model recognizes, from the unstructured natural language input, catalog entities and their respective part of speech context, the semantics and requested tasks to be performed.

The system 200 performs deep-learning (DL) of the existing catalog implementation 204 and additional operational databases 206, such as customer base. The use of the catalog-domain machine learning model can extend the understanding of the unstructured data with a specific business and industry terminology as well as supporting a conversational dialog of the user with the system 200 to perform more complex operations. Hence, prompts may be triggered by the natural language processing component 202 to increase efficiency or to refine the initial user request with data derived from external sources (such as operational database and third party partners). In an embodiment, the system 200 may be configured to converse and request additional information from the user, either upfront or during the data implementation mentioned below.

A parser 208 parses the structed catalog implementation request created by the natural language processing component 202 and generates catalog-specific meta-data for the structed catalog implementation request. The meta-data is in a format the specific catalog is expecting, and may accordingly vary between different catalog application vendors.

The 200 then provides the data implementation in the catalog 204 by storing the catalog-specific meta-data in the catalog 204, as shown.

Use-case scenario—Launch new offering to the market

The user can ask the system 200 to create new offers.

Example

User input: "Create a new offering names "Innovate 2023" which Bundles together a unlimited mobile offering and premium fixed internet service with a recurring monthly payment of 50$, this offering should be sold only to VIP customers"

System 200 function: <A new offering is created based the specifications provided, utilizing default definitions where information not specified>

In case information is missing, for example sale dates, the system 200 would ask the user for additional input.

System 200 function: < "From which date should the new offering be salable?">

Use-case scenario-Launch new promoted devices to the market

The user can drive sale of new devices with attractive pricing, and where applicable the user can ask the system 200 to sync from another inventory, to load devices, and define their selling price and promotion condition and price.

Example

User input: "Please Sync Iphone 14 set of devices from inventory, into commerce catalog. Please set the pricing of Iphone 14 Max to $799 for 256 GB all colors and $899 for 512 GB all colors, Iphone 14 to $499 for 256 GB, Add a promotional price for 30 day for all Iphone 14 devices, reducing $50 of the price if purchased together with Airpod Max"

System 200 function: <A sync process is triggered to load Iphone 14 devices, updating the pricing for each device and creating a new promotion with the requested condition and benefit>

Use-case scenario—Generate a rate change

The user can ask the system 200 to update the price for a single or multiple offers, and the system 200 will act accordingly.

Example

User input: "Please increase the recurring fee of "Student Plan 2023" by 20%, and increasement the price of all Family Plan variants by $2, the new prices should be effective from January 1st 2024"

System 200 function: <The system 200 will accumulate relevant population, create a new version of the prices with a calculated price amount based on user request, either calculate the percentage and increasement by it, or increasement by the specified value>

Use-case scenario—Defining promotions

A business user can define new promotions or update existing promotions based on customer traction and behavior, to achieve business goals.

Example

User input: "Apply an additional 10% discount on this offer specifically to all customer of this product offering between Jan. 6, 2023 to Jan. 7, 2024"

System 200 function: <The system 200 would create a promotion with eligibility conditions according to specific offers, with benefit and validity dates as specified>

User input: "Create a new promotion, targeting small business customers requesting to purchase business internet service 'Business Pro' and 'Business startpack', and provide 100% discount on installation free and 30% discount for the first 3 months on recurring fee"

System 200 function: <The system 200 would create the promotion with eligibility conditions based on the customer and service specific, with the two benefits relating to the offering specified.

Figure 3:
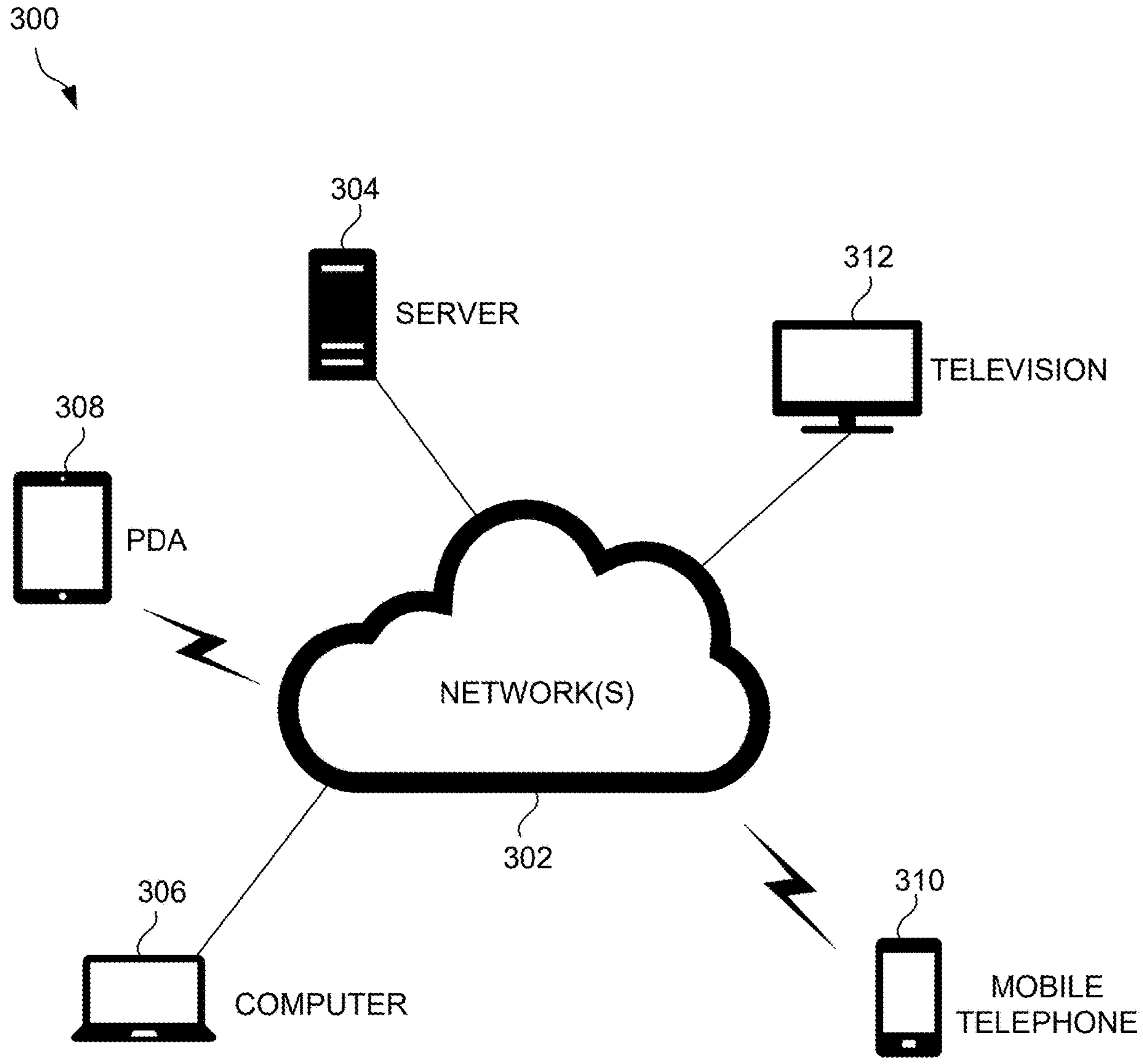
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
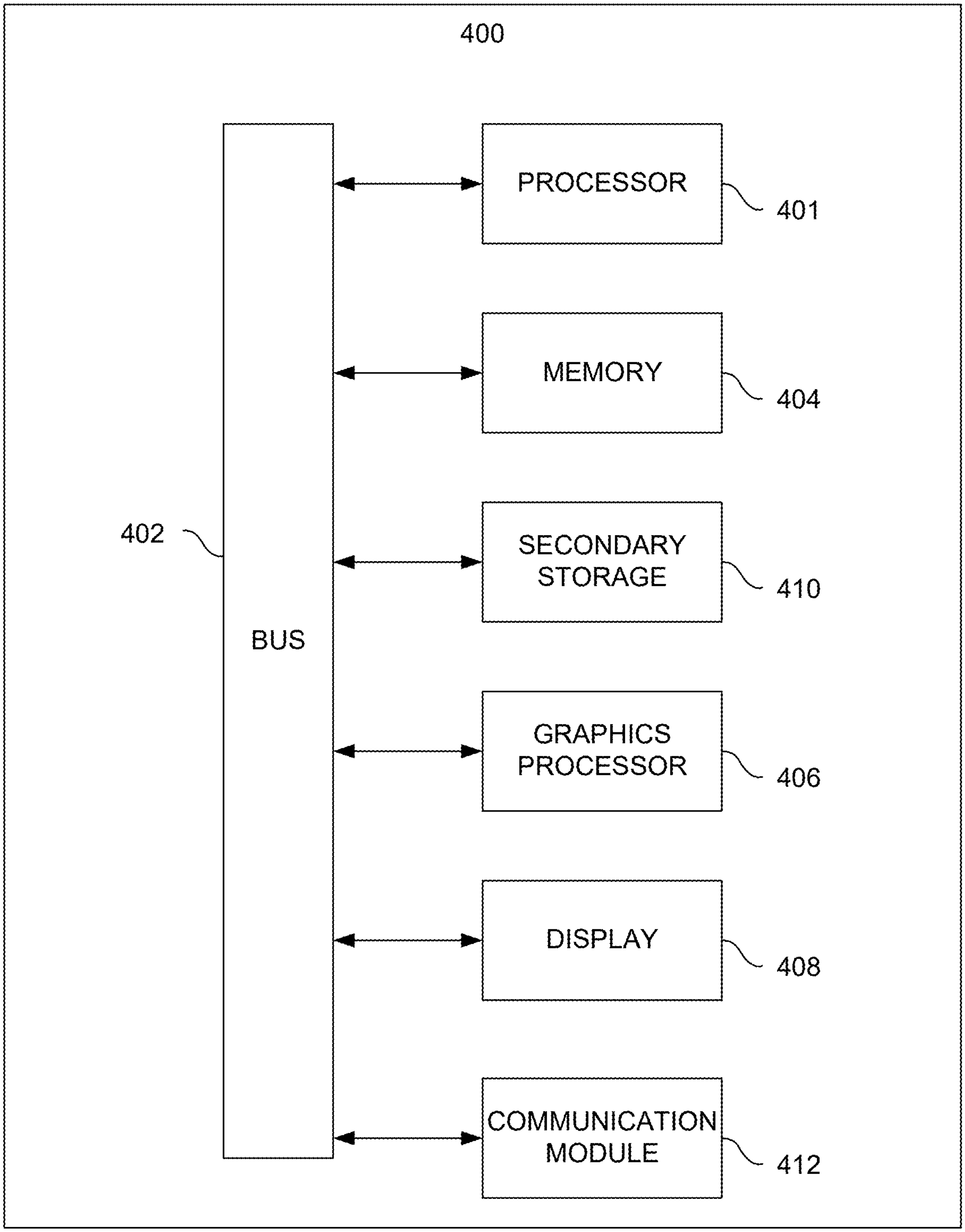
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

perform deep learning of a data structure storing a plurality of entries used for billing processes to learn, by a machine learning model, to transform given unstructured text-based natural language inputs describing requested modifications to particular entries in the data structure into implementation requests structured in accordance with a predefined structure comprised of identifiers of the particular entries in the data structure and indicators of the requested modifications;

receive an unstructured text-based natural language input entered by a user and indicating a request to modify data in the data structure;

process the unstructured text-based natural language input, using the machine learning model to:

recognize, from the unstructured text-based natural language input by the machine learning model, one or more entries in the data structure and a modification requested to be performed for the one or more entries in the data structure, detect, by the machine learning model, that additional information corresponding to the modification is required to generate a structured implementation request from the unstructured text-based natural language input, output to the user a text-based request for the additional information, receive, from the user, the additional information as an additional unstructured text-based natural language input, generate, by the machine learning model using the additional information, the structured implementation request that declares:

the one or more entries in the data structure, and the modification;

parse the structured implementation request to generate parsed data;

reformat the parsed data into data structure-specific meta-data, wherein the data structure-specific meta-data is in a format used by the data structure and is configured for storage in the data structure; and as a response to the request to modify the data in the data structure, modify the one or more entries in the data structure by storing the data structure-specific meta-data in the one or more entries in the data structure.

2. The non-transitory computer-readable media of claim 1, wherein the unstructured text-based natural language input is received via a natural language processing catalog tool.

3. The non-transitory computer-readable media of claim 1, wherein the machine learning model is further trained on at least one additional operational database.

4. The non-transitory computer-readable media of claim 3, wherein the at least one additional operational database includes a customer database.

5. A method, comprising:

at a computer system:

performing deep learning of a data structure storing a plurality of entries used for billing processes to learn, by a machine learning model, to transform given unstructured text-based natural language inputs describing requested modifications to particular entries in the data structure into implementation requests structured in accordance with a predefined structure comprised of identifiers of the particular entries in the data structure and indicators of the requested modifications;

receiving an unstructured text-based natural language input entered by a user and indicating a request to modify data in the data structure;

processing the unstructured text-based natural language input, using the machine learning model to;

recognize, from the unstructured text-based natural language input by the machine learning model, one or more entries in the data structure and a modification requested to be performed for the one or more entries in the data structure, detect, by the machine learning model, that additional information corresponding to the modification is required to generate a structured implementation request from the unstructured text-based natural language input, output to the user a text-based request for the additional information, receive, from the user, the additional information as an additional unstructured text-based natural language input, generate, by the machine learning model using the additional information, the structured implementation request that declares:

the one or more entries in the data structure, and the modification;

parsing the structured implementation request to generate parsed data;

reformatting the parsed data into data structure-specific meta-data, wherein the data structure-specific meta-data is in a format used by the data structure and is configured for storage in the data structure; and as a response to the request to modify the data in the data structure, modifying the one or more entries in the data structure by storing the data structure-specific meta-data in the one or more entries in the data structure.

6. A system, comprising:

a non-transitory memory storing instructions; and one or more processors in communication with the non-transitory memory that execute the instructions to:

perform deep learning of a data structure storing a plurality of entries used for billing processes to learn, by a machine learning model, to transform given unstructured text-based natural language inputs describing requested modifications to particular entries in the data structure into implementation requests structured in accordance with a predefined structure comprised of identifiers of the particular entries in the data structure and indicators of the requested modifications;

receive an unstructured text-based natural language input entered by a user and indicating a request to modify data in the data structure;

process the unstructured text-based natural language input, using the machine learning model to;

recognize, from the unstructured text-based natural language input by the machine learning model, one or more entries in the data structure and a modification requested to be performed for the one or more entries in the data structure, detect, by the machine learning model, that additional information corresponding to the modification is required to generate a structured implementation request from the unstructured text-based natural language input, output to the user a text-based request for the additional information, receive, from the user, the additional information as an additional unstructured text-based natural language input, generate, by the machine learning model using the additional information, the structured implementation request that declares:

the one or more entries in the data structure, and the modification;

parse the structured implementation request to generate parsed data;

reformat the parsed data into data structure-specific meta-data, wherein the data structure-specific meta-data is in a format used by the data structure and is configured for storage in the data structure; and as a response to the request to modify the data in the data structure, modify the one or more entries in the data structure by storing the data structure-specific metadata in the one or more entries in the data structure.

* * * * *